No. 741,938. PATENTED OCT. 20, 1903.
A. SELL.
TRACTION WHEEL OR RUNNER.
APPLICATION FILED MAR. 24, 1903.
NO MODEL.
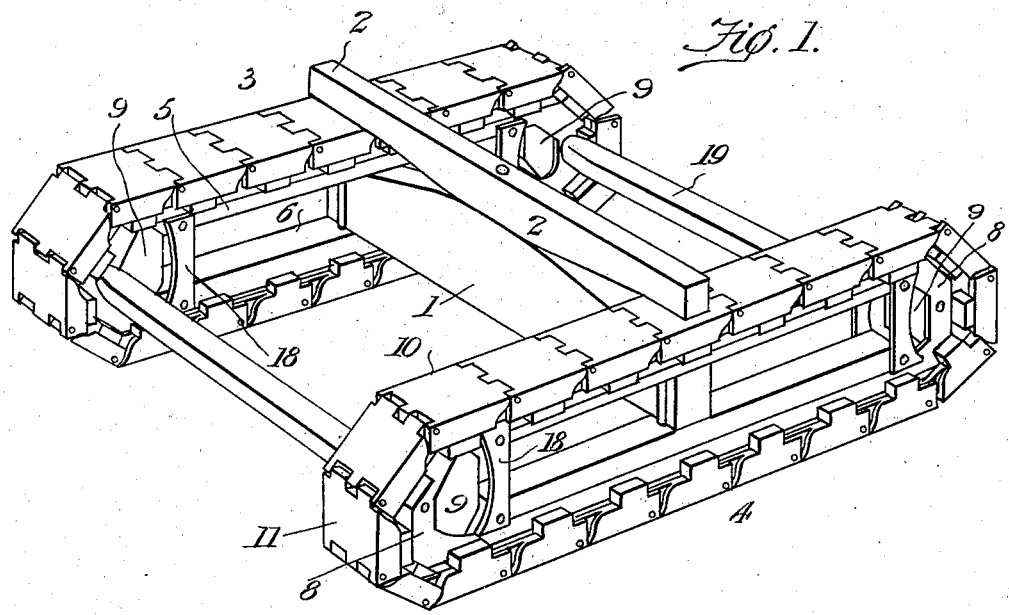
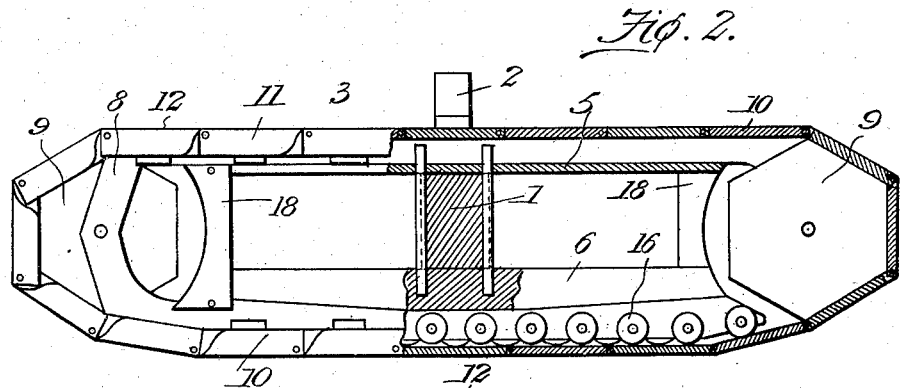
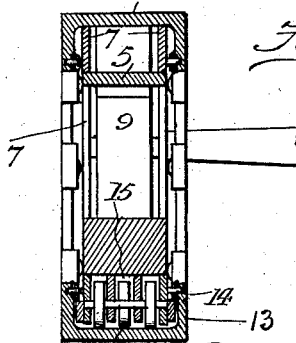
Witnesses
Andrew Sell
Inventor
by C. A. Snow & Co.
Attorneys No. 741,938.

Patented October 20, 1903.

UNITED STATES PATENT OFFICE.

ANDREW SELL, OF MORA, MINNESOTA.

TRACTION WHEEL OR RUNNER.

SPECIFICATION forming part of Letters Patent No. 741,938, dated October 20, 1903.

Application filed March 24, 1903. Serial No. 149,375. (No model.)

*To all whom it may concern:*

Be it known that I, ANDREW SELL, a citizen of the United States, residing at Mora, in the county of Kanabec and State of Minnesota, have invented a new and useful Vehicle Wheel or Runner, of which the following is a specification.

My invention relates to vehicle wheels or runners, and has for its objects to produce a device of this character simple of construction, efficient in operation, and one which will travel smoothly and freely directly over the surface of the ground or over snow.

To these ends the invention comprises the details of construction and combination of parts more fully hereinafter described and claimed.

In the accompanying drawings, Figure 1 is a perspective view of a pair of runners constructed and connected in accordance with my invention. Fig. 2 is a longitudinal sectional elevation of one of the runners. Fig. 3 is a transverse sectional elevation of the same.

Referring to the drawings, 1 indicates the vehicle-axle provided with a bolster 2, which latter sustains one end of the vehicle-body, as usual. These parts may be of any suitable or desired construction and material, inasmuch as they constitute no part of my invention. Fixed in any suitable manner to the opposite ends of the axle are runners 3 4, constructed in accordance with my invention, and inasmuch as these runners are identical in construction and operation I will describe but one in detail.

Each runner has a framework comprising a top horizontal bar 5, a lower bar 6, and side members 7, which latter lie at opposite sides of the top and bottom bars and are suitably spaced apart thereby to form longitudinal channels between the side members for the purpose hereinafter described. The side members are preferably in the form of sheet-metal skeleton plates, each having a top portion which extends longitudinally of the top bar and projects vertically above the upper face of the same, a lower portion which extends longitudinally of the bottom bar and projects vertically beneath the lower face of the same, and end connecting-webs 8, which project a suitable distance beyond the top and bottom bars of the frame at the ends thereof. The webs 8 of the side members receive between them polygonal rollers 9, which are journaled for rotation on suitable axles, there being two of these rollers for each runner, one at either end thereof, to sustain an endless chain 10, which constitutes the tread of the runner and now to be described.

The chain 10 is made up of a series of links 11, pivotally connected one with another in any suitable manner and each having a horizontal portion 12 and vertical sides or flanges 13, which latter lie at opposite sides of the framework of the runner in order to guide the chain in its travel around the framework of the runner. Mounted in suitable bearings at the top of each of the vertical flanges 13 is an antifriction-roller 14, and these antifriction-rollers bear upon the side members of the runner-frames to render the chain frictionless in its travel around the same. The lower edges of the side members are provided with laterally-extending ribs with which the edges of the rollers 14 engage to prevent the chain becoming disconnected from the frame.

Within the longitudinal channel 15, formed at the lower side of the runner-frame by the side members projecting below the bottom bar 6, is mounted in suitable bearings antifriction-rollers 16, against which the upper faces of the horizontal portions of the links travel antifrictionally during the passage of the runner over the ground, as will be readily understood.

18 indicates vertical braces which connect the top and bottom bars of the frame at their ends, and 19 indicates horizontal braces which connect the ends of the runners in pairs.

The operation of the device is as follows: The outer faces of the links 11 conjointly constitute the tread of the runner in its travel over the ground, and during such travel the chain will ride upon the end rollers 9 at the ends of the frame, upon the antifriction-rollers 16 at the bottom of the frame, and the rollers 14, sustained by the side flanges of the links and bearing upon the sides of the frame, thus rendering the chain frictionless in its movement around the frame, and as the vehicle is drawn forward the chain travels around the frame, thus causing the runner to ride smoothly and evenly and with slight friction over the surface of the ground or over snow.

From the foregoing description it will be seen that I produce a comparatively simple device for attaining the ends in view and one which in practice will be efficient and durable, and it is to be understood that I do not limit myself to the precise details herein shown and described, inasmuch as minor changes may be made therein without departing from the spirit or scope of my invention.

Having thus described my invention, what I claim is—

1. In a device of the class described, the combination with a frame provided at its lower edge with antifriction devices, of rollers journaled in said frame, a chain traveling upon said rollers, and antifriction devices carried by said chain and bearing upon the sides of the frame.

2. In a device of the class described, the combination with a frame having a channel formed in its lower edge, of antifriction-rollers journaled in said channel, rollers journaled in said frame, a chain traveling upon said rollers, and antifriction-rollers carried by said chain and bearing upon the sides of the frame.

3. In a device of the class described, the combination with a frame having a channel formed in its lower edge, of antifriction-rollers journaled in said channel, supporting-rollers journaled in said frame, a chain traveling upon said supporting-rollers and provided with side flanges embracing the frame, and antifriction-rollers carried by said side flanges and bearing upon the sides of the frame.

4. In a device of the class described, the combination with a frame having a channel formed in its lower edge and longitudinally-extending lateral ribs, of antifriction-rollers journaled in said channel, supporting-rollers journaled in said frame, a chain traveling upon said supporting-rollers and provided with side flanges embracing the frame, and antifriction-rollers carried by the side flanges and bearing upon the sides of the frame, said rollers also engaging the longitudinal ribs to prevent escape of the chain from the frame.

In testimony that I claim the foregoing as my own I have hereto affixed my signature in the presence of two witnesses.

ANDREW SELL.

Witnesses:
HARRY STONE,
LAUD R. RUTHERFORD.